US011036980B2

(12) United States Patent
Nakata et al.

(10) Patent No.: US 11,036,980 B2
(45) Date of Patent: Jun. 15, 2021

(54) INFORMATION PROCESSING METHOD AND INFORMATION PROCESSING SYSTEM

(71) Applicant: Panasonic Intellectual Property Corporation of America, Torrance, CA (US)

(72) Inventors: Yohei Nakata, Osaka (JP); Yasunori Ishii, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 148 days.

(21) Appl. No.: 16/257,157

(22) Filed: Jan. 25, 2019

(65) Prior Publication Data
US 2019/0236353 A1  Aug. 1, 2019

Related U.S. Application Data

(60) Provisional application No. 62/623,130, filed on Jan. 29, 2018.

(30) Foreign Application Priority Data

Sep. 21, 2018  (JP) .............................. JP2018-177877

(51) Int. Cl.
*G06K 9/00* (2006.01)
*G06N 5/04* (2006.01)
(Continued)

(52) U.S. Cl.
CPC .......... *G06K 9/00536* (2013.01); *G06N 3/08* (2013.01); *G06N 3/082* (2013.01); *G06N 5/04* (2013.01); *G06N 20/00* (2019.01)

(58) Field of Classification Search
CPC .......... G06N 3/08; G06N 3/082; G06N 20/00; G06N 5/04; G06N 3/04; G06N 3/0454;
(Continued)

(56) References Cited

U.S. PATENT DOCUMENTS

2004/0059695 A1* 3/2004 Xiao ...................... G06N 3/082
706/25
2013/0339919 A1* 12/2013 Baseman ............... G06Q 10/04
716/136
(Continued)

FOREIGN PATENT DOCUMENTS

WO     2017/149722     9/2017

OTHER PUBLICATIONS

Extended European Search Report dated Jun. 25, 2019 in corresponding European Patent Application No. 19152926.2.

*Primary Examiner* — Michael J Vanchy, Jr.
(74) *Attorney, Agent, or Firm* — Wenderoth, Lind & Ponack, L.L.P.

(57) ABSTRACT

An information processing method including the following executed using a computer: obtaining a neural network model that solves a regression problem; obtaining input data and label data corresponding to the input data; compressing a network of the neural network model to obtain a compressed model; transforming the regression problem to be solved by the neural network model into a classification problem, based on information indicating performance of the compressed model, the information being calculated using the label data and output data which is obtained by inputting the input data to the compressed model; and changing a network configuration of the neural network model and transforming the label data, in accordance with the transformation from the regression problem to the classification problem.

10 Claims, 3 Drawing Sheets

(51) Int. Cl.
*G06N 3/08* (2006.01)
*G06N 20/00* (2019.01)

(58) Field of Classification Search
CPC ... G06N 3/084; G06K 9/00536; G06K 9/4628
See application file for complete search history.

(56) References Cited

U.S. PATENT DOCUMENTS

| | | | |
|---|---|---|---|
| 2016/0078339 A1* | 3/2016 | Li | G06N 7/005 706/20 |
| 2016/0335536 A1* | 11/2016 | Yamazaki | G06N 3/04 |
| 2017/0220929 A1* | 8/2017 | Rozen | G06N 3/063 |
| 2018/0268292 A1* | 9/2018 | Choi | G06K 9/6217 |
| 2020/0184337 A1* | 6/2020 | Baker | G06K 9/6264 |

* cited by examiner

INFORMATION PROCESSING METHOD AND INFORMATION PROCESSING SYSTEM

CROSS REFERENCE TO RELATED APPLICATION

This application claims the benefit of priority of U.S. Provisional Patent Application No. 62/623,130 filed on Jan. 29, 2018, claiming the benefit of priority of Japanese Patent Application Number 2018-177877 filed on Sep. 21, 2018, the entire contents of which are hereby incorporated by reference.

BACKGROUND

1. Technical Field

The present disclosure relates to an information processing method and an information processing system.

2. Description of the Related Art

In recent years, research and development has been conducted on deep learning-based neural networks. A deep learning-based neural network, however, requires a large amount of computational resources and a very long computation time because the amount of computation in training is massive. A reduced amount of computation is therefore demanded.

PCT International Publication No. WO 2017/149722 (Patent Literature 1), for example, discloses a computing method in which scalar quantization is performed in a certain layer in a multilayered neural network, and in the next layer, scalar quantized vectors are multiplied with a weighting matrix. Patent Literature 1 thereby assumes that it is possible, with this computing method, to reduce the amount of computation in a multilayered neural network.

SUMMARY

With the conventional technique disclosed in Patent Literature 1, however, the performance of a model might be degraded due to the compression of the model. With a neural network model that solves a regression problem, for example, an output resolution of the model becomes less accurate due to the compression of the model, and this might decrease the accuracy of the outputs of the model.

In view of the above, the present disclosure has an object to provide an information processing method and an information processing system with which it is possible to inhibit the performance degradation of a model due to compression.

In order to achieve the above-described object, an information processing method according to one embodiment of the present disclosure includes the following executed using a computer: obtaining a neural network model that solves a regression problem; obtaining input data and label data (correct answer data) corresponding to the input data; compressing a network of the neural network model to obtain a compressed model; transforming the regression problem to be solved by the neural network model into a classification problem, based on information indicating performance of the compressed model, the information being calculated using the label data and output data which is obtained by inputting the input data to the compressed model; and changing a network configuration of the neural network model and transforming the label data, in accordance with the transformation from the regression problem to the classification problem.

Note that these comprehensive or concrete embodiments may be realized by a system, a method, an integrated circuit, a computer program, or a computer-readable recording medium such as a CD-ROM, or by any combination thereof.

With the information processing method, etc. according to the present disclosure, it is possible to inhibit the performance degradation of a model due to compression.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

Figure 1:
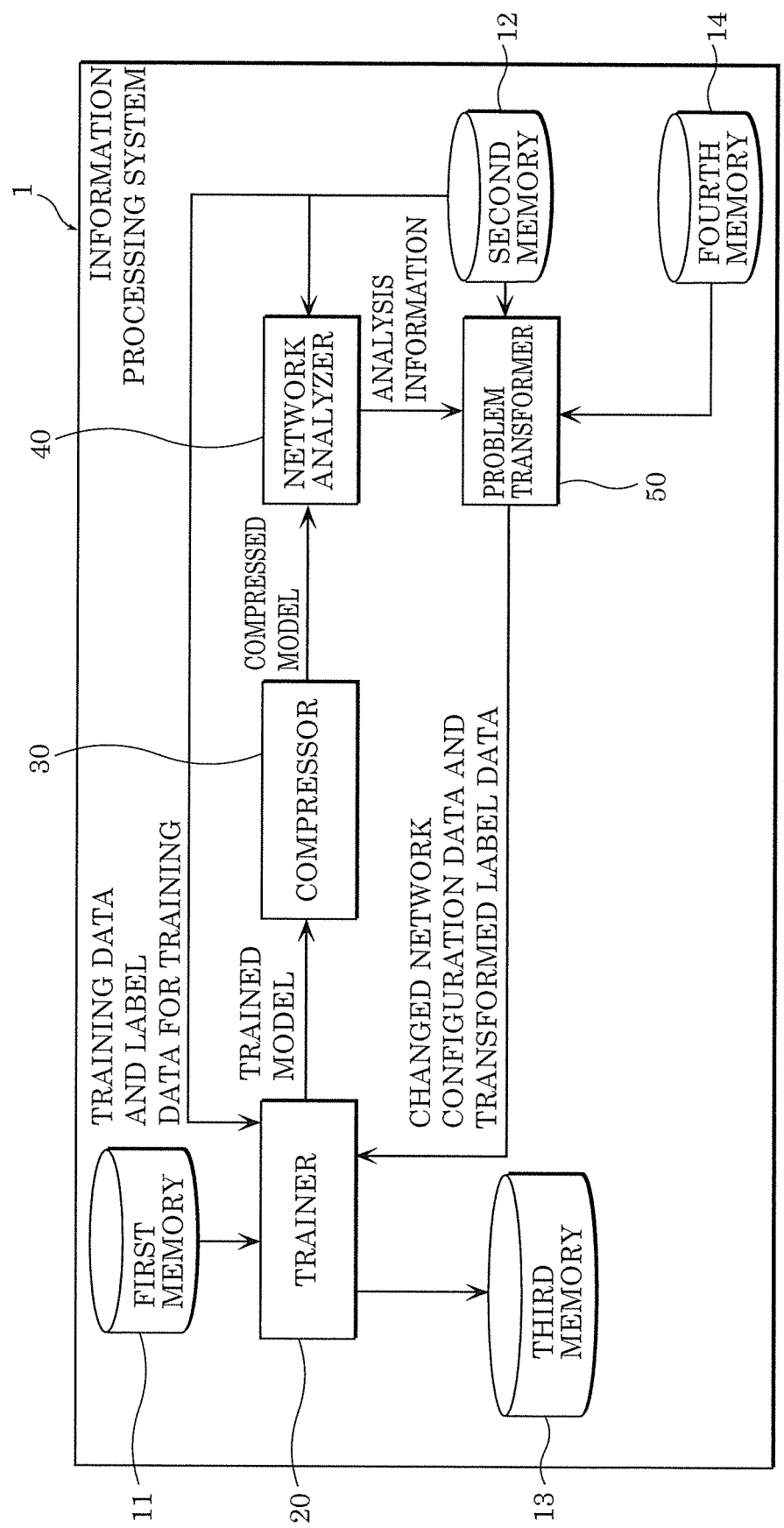
FIG. 1 is a block diagram illustrating an information processing system according to an embodiment.

An information processing method according to one embodiment of the present disclosure includes the following executed using a computer: obtaining a neural network model that solves a regression problem; obtaining input data and label data corresponding to the input data; compressing a network of the neural network model to obtain a compressed model; transforming the regression problem to be solved by the neural network model into a classification problem, based on information indicating performance of the compressed model, the information being calculated using the label data and output data which is obtained by inputting the input data to the compressed model; and changing a network configuration of the neural network model and transforming the label data, in accordance with the transformation from the regression problem to the classification problem.

With this method, by transforming a problem to be solved by a model from a regression problem to a classification problem, it is possible to acquire output data obtained by solving, as a classification problem, the problem indicated by input data. Compared to a regression problem, a classification problem is less affected by compression, that is, resolution degradation. Accordingly, it is possible to inhibit the accuracy degradation of a model due to compression. For example, when a model is an object detection model, a regression problem of inferring the size of a target object for which detection is carried out is transformed into a classification problem of inferring a class in the classification of predetermined ranges for the size of the target object. By defining each predetermined range to be narrower than an output resolution for solving a regression problem, it is possible to enhance more the accuracy of outputs, compared to the case of using a compressed model that solves a regression problem. Accordingly, it is possible to inhibit the accuracy drops of the outputs of a model due to compression. The information processing method according to the present disclosure is effective particularly in the case where compression is quantization into lower number of bits, such as binarization.

An information processing system according to one embodiment of the present disclosure includes: a first obtainer that obtains a neural network model that solves a regression problem; a second obtainer that obtains input data and label data corresponding to the input data; a compressor that compresses a network of the neural network model to obtain a compressed model; and a problem transformer that: transforms the regression problem to be solved by the neural network model into a classification problem, based on information indicating performance of the compressed model, the information being calculated using the label data and output data which is obtained by inputting the input data to the compressed model; and changes a network configuration of the neural network model and transforms the label data, in accordance with the transformation from the regression problem to the classification problem.

An information processing method according to one aspect of the present disclosure includes the following executed using a computer: obtaining a neural network model for object detection which solves a regression problem; obtaining input image data and label data corresponding to the input image data; compressing a network of the neural network model to obtain a compressed model; transforming the regression problem to be solved by the neural network model into a classification problem, based on information indicating performance of the compressed model, the information being calculated using the label data and output data which is obtained by inputting the input image data to the compressed model; and changing a network configuration of the neural network model and transforming the label data, in accordance with the transformation from the regression problem to the classification problem.

With the information processing system and information processing method as described above, the same advantageous effects as described above are produced.

In the information processing method according to one embodiment of the present disclosure, the changing of the network configuration includes changing the number of nodes in the neural network model.

With this, it is possible to change the number of nodes in an original model to that in a compressed model according to inference accuracy desired for output data. It is therefore possible to relatively easily realize a transformation from a regression problem to a classification problem.

In the information processing method according to one embodiment of the present disclosure, the changing of the number of nodes includes increasing the number of nodes in an output layer of the neural network model.

With this, since nodes in an output layer have more influence on the outputs of a model than nodes in any other layer, in a neural network, it is possible to effectively change the network configuration of the neural network according to the performance of the model.

In the information processing method according to one embodiment of the present disclosure, the increasing of the number of nodes includes changing a distribution of the nodes.

With this, it is possible to increase the number of nodes in an output layer without changing the number of nodes in a model. This can inhibit an increase in the amount of computational resources.

In the information processing method according to one embodiment of the present disclosure, the changing of the network configuration includes changing the number of nodes in the neural network model within a range in which a condition for a computational resource is satisfied, the computational resource being usable by the compressed model.

With this, it is possible to generate a model whose problem has been transformed and which satisfies the hardware requirements of a computer by which a compressed model is used. For example, as long as the conditions for computational resources such as a processing speed, the amount of computation, and a memory size are satisfied, it is possible to increase the number of nodes in a compressed model.

In the information processing method according to one embodiment of the present disclosure, the information indicating the performance is information based on a difference between the output data and the label data.

With this, it is possible to control whether problem transformation should be performed, based on a performance index regarding the accuracy of an output of a model.

In the information processing method according to one embodiment of the present disclosure, the compressing of the network includes changing a weight for the neural network model in accordance with a change in computation precision from floating-point to fixed-point representation.

With this, it is possible to generate a model that can be implemented even by hardware, such as an embedded system, which provides difficult hardware environment for carrying out floating-point processing.

The information processing method according to one embodiment of the present disclosure includes: determining whether the information indicating the performance satisfies a predetermined condition; and transforming the regression problem into the classification problem based on a result of the determination.

With this, it is possible to control whether problem transformation should be performed, based on a predetermined condition.

In the information processing method according to one embodiment of the present disclosure, the changing of the network configuration includes setting output-weights each being set for a different one of outputs of nodes in the neural network model, and an output of the neural network model is determined using the outputs and the output-weights of the nodes.

With this, it is possible to enhance the accuracy of the outputs of a model.

The following describes in detail the embodiment for implementing the present invention with reference to the drawings. Note that the embodiments described below each show an illustrative embodiment of the present disclosure. The numerical values, shapes, materials, elements, the arrangement and connection of the elements, steps, order of the steps, etc. indicated in the following embodiments are mere examples, and therefore are not intended to limit the scope of the present disclosure. Therefore, among elements in the following embodiments, those not recited in any one of the broadest, independent claims are described as optional elements.

Note that the drawings are presented schematically and are not necessarily precise illustrations. In addition, like reference signs indicate like elements in the drawings, and overlapping descriptions thereof are omitted or simplified.

The following describes the information processing method and information processing system according to an embodiment of the present disclosure.

Embodiment (Configuration)

FIG. 1 is a block diagram illustrating information processing system 1 according to an embodiment.

As illustrated in FIG. 1, information processing system 1 is a system for generating a model. A model is, for example, an object detection model for detecting an object that appears in an image. The object detection model carries out inference (also referred to as labeling) of a class of a target object for which detection is carried out or inference of the size or location of the target object. The class of a target object is a type of the target object or the like, e.g., dog, horse, person, etc.

Information processing system 1 includes trainer 20, compressor 30, network analyzer 40, problem transformer 50, first memory 11, second memory 12, third memory 13, and fourth memory 14.

Trainer 20 obtains network configuration data from first memory 11 and performs training of a neural network model having a network configuration indicated by the network configuration data. Specifically, trainer 20 obtains, from second memory 12, input data for training (i.e. training data) and label data for training, and updates the parameters of the model, that is, weights of nodes, using a difference between label data for training and output data obtained by inputting the input data for training to the model. When the update of the parameters is completed, trainer 20 outputs the model that has been trained (hereinafter also referred to as "trained model"). Parameters of a trained model are, for example, weight vectors and bias values used in a neural network, and scaling values for batch normalization. Trainer 20 is one example of the first obtainer.

Additionally, trainer 20 performs retraining of the model using, the input data for training obtained from second memory unit 12, and network configuration data that has been changed and label data for training that has been transformed which are obtained from problem transformer 50 which will be mentioned later on. Trainer 20 stores, in third memory 13, the trained model obtained through the retraining.

Compressor 30 obtains the trained model from trainer 20 and compresses the trained model. The compression is quantization of the parameters of the trained model. The quantization of the parameters is, for example, converting parameters from floating-point to fixed-point representation. Compressor 30 outputs the model that has been compressed (hereinafter referred to as "compressed model").

Network analyzer 40 obtains the compressed model from compressor 30, also obtains input data for evaluation and label data for evaluation, and analyzes the performance of the compressed model. Specifically, network analyzer 40 calculates a difference value between label data for evaluation and output data obtained by inputting the input data for evaluation to the compressed model, and analyzes the performance of the compressed model based on this difference value. Network analyzer 40 outputs analysis information which is an analysis result indicating the performance of the compressed model. Here, a difference value is one example of information indicating the difference between the label data for evaluation and the output data. The size of a difference value signifies the performance of a compressed model. In other words, the smaller a difference value is, the better the performance of a compressed model is. It should be noted that the performance of a compressed model includes the accuracy of a compressed model. It should be noted that the performance may be, for example, precision, recall, mean average precision (mAP), and area under the curve (AUC). In the case where a model is an object detection model in which an image is input, input data is image information and output data is a result of object detection. Network analyzer 40 is one example of the second obtainer.

Problem transformer 50 obtains analysis information from network analyzer 40 and transforms, based on the analysis information, a problem to be solved by the model from a regression problem to a classification problem. Problem transformer 50 changes the network configuration data of the model in accordance with the transformation from a regression problem to a classification problem.

Specifically, problem transformer 50 determines, based on the analysis information, whether the problem to be solved by the model should be transformed. Problem transformer 50 determines, for example, whether the performance of the compressed model satisfies a predetermined condition. Problem transformer 50 determines, for example, whether the accuracy of the output data of the compressed model is lower than or equal to a threshold. When the accuracy is lower than or equal to the threshold, the performance of the compressed model does not satisfy the predetermined condition.

When determining that the problem should be transformed, problem transformer 50 determines how to transform the problem. Problem transformer 50, for example, transforms a regression problem of inferring a value in the range from 0 to in into a classification problem of inferring a class from n number of classes.

$$[0-\min], [m/n-2m/n] \ldots [(n-1)m/n-m] \qquad \text{[Mathematic 1]}$$

Figure 2:
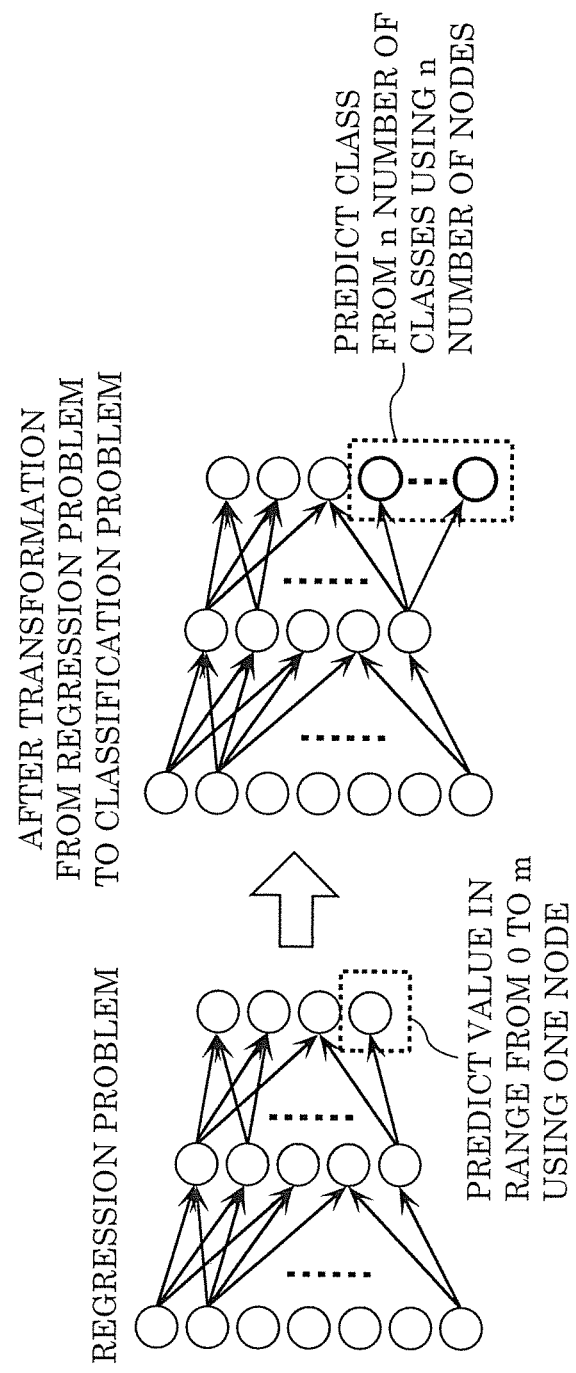
FIG. 2 is a schematic diagram illustrating a network of the information processing system according to the embodiment.

Next, problem transformer 50 changes the network configuration data of the model in accordance with the transformation of the problem. The change of the network configuration data includes a change in the number of nodes. FIG. 2 is a schematic diagram illustrating a change of network configuration data made by information processing system 1 according to the embodiment. As illustrated in FIG. 2, changing network configuration data is, for example, changing the number of nodes in an output layer that outputs output data. Changing the number of nodes in a model is, for example, increasing the number of nodes in an output layer. Increasing the number of nodes in an output layer includes, for example, changing the distribution of nodes within a network and adding nodes to a network. Changing the distribution of nodes is, for example, replacing nodes in a layer other than an output layer to the output layer. Adding nodes is, for example, newly adding nodes as a network to an output layer. Problem transformer 50 outputs, to trainer 20, the changed network configuration data of the model. The change will be described in detail later on.

Note that problem transformer 50 changes network configuration data based on restricted conditions. As illustrated in FIG. 1, problem transformer 50 obtains transformation-constrained data from fourth memory 14. The transformation-constrained data indicates computational resources usable by a compressed model in a computer by which the compressed model is implemented. Problem transformer 50 changes the number of nodes in the model within a range in which conditions for the computational resources usable by the compressed model are satisfied. Regarding a limitation for the number of nodes that can be changed, the lower limit is determined according to desired performance while the upper limit is determined according to the conditions for computational resources.

In addition, problem transformer 50 obtains label data from second memory 12 and transforms label data from label data of a regression problem to label data of a classification problem. Problem transformer 50 outputs the transformed label data to trainer 20.

First memory 11 stores the network configuration data of a neural network model that solves a regression problem. Note that network configuration data that has been changed may also be stored in first memory 11.

Second memory 12 stores input data and label data that are to be used for training or performance evaluation of a model.

It should be noted that the input data includes input data for evaluation and input data for training, and the label data includes label data for evaluation and label data for training.

Third memory 13 stores trained models including trained models obtained through retraining after problem transformation.

Fourth memory 14 stores transformation-constrained data.

(Operations)

Next, operations performed by information processing system 1 according to this embodiment will be described.

Figure 3:
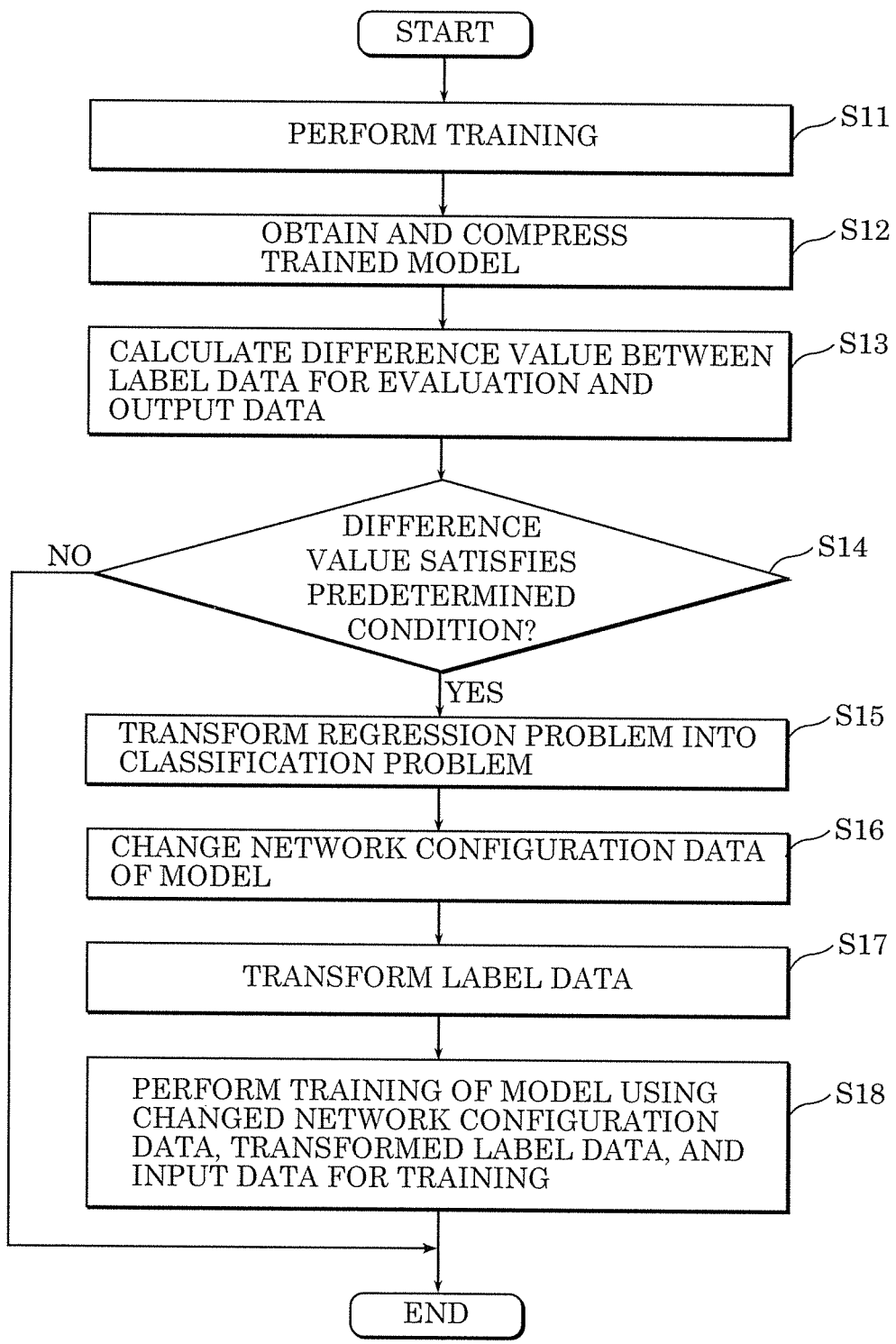
FIG. 3 is a flowchart illustrating operations performed by the information processing system according to the embodiment.

FIG. 3 is a flowchart illustrating the operations performed by information processing system 1 according to the embodiment.

As illustrated in FIG. 3, trainer 20 firstly performs training of a neural networking model having the network configuration indicated by the network configuration data obtained from first memory 11 (S11). Trainer 20 outputs a trained model to compressor 30.

Next, compressor 30 obtains the trained model from trainer 20 and compresses the trained model into a compressed model (S12). Here is one example. When a trained model is compressed into a model that solves a regression problem using 3 bits, resolution is calculated by $100/2^3=12.5$. Supposing that a true value as input data is 69, an inference value of the compressed model is 62.5. Note that 3 bits is one example and the number of bits shall not be limited to such. For example, binarization may be performed using 1 bit. Compressor 30 then outputs the compressed model to network analyzer 40.

Next, network analyzer 40 obtains the compressed model from compressor 30, and also obtains input data for evaluation and label data for evaluation from second memory 12. Network analyzer 40 calculates a difference value between label data for evaluation and output data obtained by inputting the input data for evaluation to the compressed model (S13). Network analyzer 40 analyzes the performance of the compressed model based on the difference value. Network analyzer 40 outputs analysis information which is an analysis result indicating the performance of the compressed model. The calculation of a difference value will be described using an example. Network analyzer 40 inputs image information (one example of input data) to the compressed model. With the use of the compressed model, a range (i.e., location and size) of a target object which appears in an image and for which detection is carried out is inferred by solving a regression problem. Network analyzer 40 then obtains a result of the inference (stated differently, a result of the object detection) carried out using the compressed model, that is, output data. Network analyzer 40 calculates a range of an image in which the target object is present, which results from the object detection carried out using the compressed model, and also calculates a difference value between the calculated range and a range indicated by the label data for evaluation. Then, network analyzer 40 outputs the calculated difference value to problem transformer 50.

Next, problem transformer 50 determines whether a problem to be solved by the model should be transformed based on the analysis information, that is, whether the difference value satisfies a predetermined condition (S14). The determination on whether the difference value satisfies a predetermined condition is, for example, a determination on whether the accuracy of the output data of the compressed model is smaller than or equal to a threshold.

Next, when the difference value satisfies the predetermined condition (YES in S14), problem transformer 50 transforms the problem to be solved by the model from a regression problem to a classification problem, based on the analysis information obtained from network analyzer 40 (S15). The reason for transforming this way is because a classification problem is less affected by resolution degradation due to compression, that is, because errors hardly occur in the result of inference carried out using a model. A regression problem, however, is easily affected by resolution degradation due to compression, that is, errors easily occur in the result of inference carried out using a model. Note that when the difference value does not satisfy the predetermined condition (NO in S14), the processing ends.

Next, problem transformer 50 changes the network configuration data in accordance with the transformation of problem (S16). Problem transformer 50 obtains transformation-constrained data from fourth memory 14, and changes the number of nodes in the model within a range in which the conditions for computational resources usable by the compressed model are satisfied. The conditions for computational resources are conditions dependent on a processing speed, the amount of computation, and a memory size.

Here is one example. Problem transformer 50 transforms a regression problem of inferring a value, as output data, in the range from 0 to 100 into a classification problem of inferring a class from 10 (=n) classes that are [0-10], [10-20] . . . and [90-10]. Thus, problem transformer 50, which inferred a value ranging from 0 to 100, using one node in a model that solves a regression problem, makes changes so that the output layer of the model has 10 nodes, and infers a class from 10 classes. Therefore, when a trained model is compressed into a model that processes 1 node using 3 bits, for example, the output resolution of the compressed model is 12.5 in the case of solving the regression problem of inferring a value in the range from 0 to 100 whereas the output resolution is 10 in the case of solving the classification problem of classifying the numbers from 0 to 100 into 10 classes. The compressed model is therefore less affected by compression, that is, resolution degradation.

Problem transformer 50 then outputs, to trainer 20, the changed network configuration data of the model.

Next, problem transformer 50 obtains label data from second memory 12, and transforms the label data from label data of a regression problem to label data of a classification problem (S17). Problem transformer 50 outputs the transformed label data to trainer 20.

Next, trainer 20 performs training of the model using the changed network configuration data and the transformed label data that are obtained from problem transformer 50, and input data for training obtained from second memory 12 (S18).

Trainer 20 stores, in third memory 13, trained models including trained models obtained through training performed after problem transformation.

Advantageous Effects, Etc

Thus, information processing system 1 calculates a difference value between label data and output data obtained from a compressed model, and transforms a problem to be solved by the compressed model from a regression problem to a classification problem, based on the difference value. This enables information processing system 1 to generate a model that obtains output data which is a result of solving, as a classification problem, a problem indicated by input data. A classification problem is less affected by compression, that is, resolution degradation, as compared to a regression problem. Accordingly, it is possible to inhibit the performance degradation of a model due to compression.

(Variation)

Problem transformer 50 may further set output-weights for each of outputs of nodes included in a model whose problem has been transformed from a regression problem to a classification problem. The output of a model is determined using the outputs and the output-weights of the nodes. The output of a model is, for example, a weighted sum of scores (e.g., numeric values using likelihoods) obtained by N number of classes.

Supposing, for example, that the scores of classes 1 through 4 are represented by x1 through x4, respectively, and the output-weights of classes 1 through 4 are represented by w1 through w4, respectively, a weighted sum, i.e., an output of a model is derived by x1×w1+x2×w2+x3×w3+x4×w4. More specifically, when a trained model is compressed into a model that processes 1 node using 3 bits, and a true value as input data is 69, the output of the compressed model in solving the regression problem of inferring a value in the range from 0 to 100 is 62.5. In contrast, in the case of solving the classification problem of classifying the numbers from 0 to 100 into 10 classes, when the output-weights of the classes are equal and a score of each class is calculated as a value derived by multiplying an average value of the classes with a likelihood, the likelihoods of class [50-60], class [60-70], class [70-80], and class [80-90] are 0.1, 0.4, 0.4, and 0.1, respectively, a weighted sum of the classes is 70. Therefore, the compressed model for solving a classification problem rather than that for solving a regression problem is capable of inferring a value approximate to the true value of 69.

Other Embodiments

The information processing method and the information processing system according to one or more embodiments of the present disclosure have been described based on the exemplary embodiments. The present disclosure, however, is not limited to these exemplary embodiments.

Each of the processing units included in the information processing method, the information processing system according to each of the aforementioned Embodiments is typically realized, for example, as an LSI which is an integrated circuit. These circuits may be individually realized as one chip or may be realized as one chip including part or all of the circuits.

Each of the processing units to be realized as an integrated circuit is not limited to LSI and may be realized as a dedicated circuit or a general-purpose processor. A field programmable gate array (FPGA) which can be programmed after an LSI is manufactured or a reconfigurable processor which can reconfigure connection or setting of circuit cells inside an LSI may be used.

It should be noted that in each of the aforementioned embodiments, each component may be configured by dedicated hardware or may be realized by executing a software program suitable for each component. Each component may be realized by causing a program executing unit such as a CPU or a processor to read a software program recorded on a recording medium such as a hard disk or a semiconductor memory and execute the software program.

All the numbers used above are exemplary numbers to specifically describe the present disclosure, and the present disclosure is not limited to the illustrated numbers.

Division of a functional block in each block diagram is an example, and plural functional blocks may be realized as one functional block, one functional block may be divided into plural functional blocks, or part of functions may be transferred to another functional block. Besides, single hardware or software may process, in parallel or by way of time division, functions of plural functional blocks having similar functions.

An order to execute each step in the flowchart is an exemplary order for specifically describing the present disclosure, and may be other than the above-described order. Furthermore, part of the above-described steps may be executed at the same time as (in parallel to) the execution of other steps.

The information processing method and the information processing system according to one or multiple aspects of the present disclosure have been described based on the exemplary embodiments. The embodiments of the present disclosure, however, are not limited to the multiple aspects. Forms obtained by various modifications to each of the foregoing embodiments that can be conceived by a person skilled in the art as well as forms realized by combining components of different embodiments within the scope of the essence of the present disclosure are included in one or multiple aspects of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be applied to an embedded device in which computational resources are limited.

What is claimed is:

1. An information processing method, comprising the following executed using a processor and a memory:
    storing, in the memory, a neural network model that solves a regression problem, input data, and label data corresponding to the input data,
    obtaining, by the processor, the neural network model, the input data, and the label data from the memory;
    compressing, by the processor, a network of the neural network model to obtain a compressed model;
    transforming, by the processor, the regression problem to be solved by the neural network model into a classification problem when accuracy of output data which is obtained by inputting the input data to the compressed model is lower than or equal to a threshold, the accuracy being calculated using the label data and the output data;

changing, by the processor, a network configuration of the neural network model in accordance with the transformation from the regression problem to the classification problem; and transforming, by the processor, label data corresponding to the regression problem to label data corresponding to the classification problem.

2. The information processing method according to claim 1, wherein the changing of the network configuration includes changing the number of nodes in the neural network model.

3. The information processing method according to claim 2, wherein the changing of the number of nodes includes increasing the number of nodes in an output layer of the neural network model.

4. The information processing method according to claim 3, wherein the increasing of the number of nodes includes changing a distribution of the nodes.

5. The information processing method according to claim 1, wherein the changing of the network configuration includes changing the number of nodes in the neural network model within a range in which a condition for a computational resource is satisfied, the computational resource being usable by the compressed model.

6. The information processing method according to claim 1, wherein the information indicating the accuracy is information based on a difference between the output data and the label data.

7. The information processing method according to claim 1, wherein the compressing of the network includes changing a weight for the neural network model in accordance with a change in computation precision from floating-point to fixed-point representation.

8. The information processing method according to claim 1, wherein the changing of the network configuration includes setting output-weights each being set for a different one of outputs of nodes in the neural network model, and an output of the neural network model is determined using the outputs and the output-weights of the nodes.

9. An information processing system, comprising:
a memory configured to store a program; and
a processor configured to execute the program and control the information processing system to:
store, in the memory, a neural network model that solves a regression problem, input data, and label data corresponding to the input data,
obtain the neural network model, the input data, and the label data from the memory;
compress a network of the neural network model to obtain a compressed model;
transform the regression problem to be solved by the neural network model into a classification problem when accuracy of output data which is obtained by inputting the input data to the compressed model is lower than or equal to a threshold, the accuracy being calculated using the label data and the output data;
change a network configuration of the neural network model in accordance with the transformation from the regression problem to the classification problem; and
transform label data corresponding to the regression problem to label data corresponding to the classification problem.

10. An information processing method, comprising the following executed using a processor and a memory:
storing, in the memory, a neural network model for object detection which solves a regression problem, input image data and label data corresponding to the input image data;
obtaining, by the processor, the neural network model, the input image data, and the label data from the memory;
compressing, by the processor, a network of the neural network model to obtain a compressed model;
transforming, by the processor, the regression problem to be solved by the neural network model into a classification problem when accuracy of output data which is obtained by inputting the input image data to the compressed model is lower than or equal to a threshold, the accuracy being calculated using the label data and the output data
changing, by the processor, a network configuration of the neural network model in accordance with the transformation from the regression problem to the classification problem; and
transforming, by the processor, label data corresponding to the regression problem to label data corresponding to the classification problem.

* * * * *